No. 881,234.  
PATENTED MAR. 10, 1908.  
G. FUSCH.  
VALVE.  
APPLICATION FILED DEC. 16, 1907.
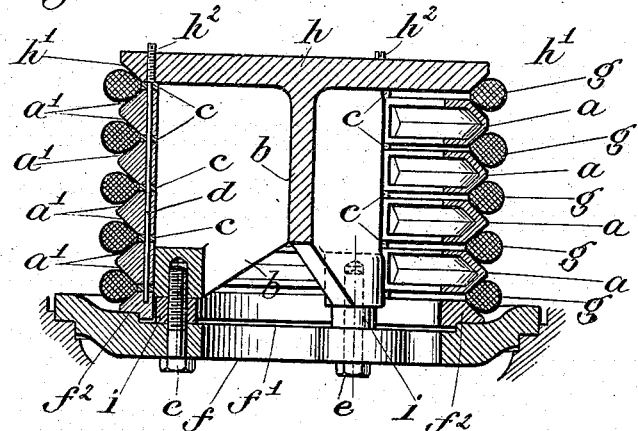
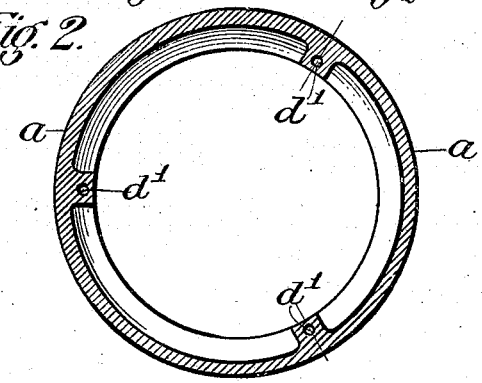
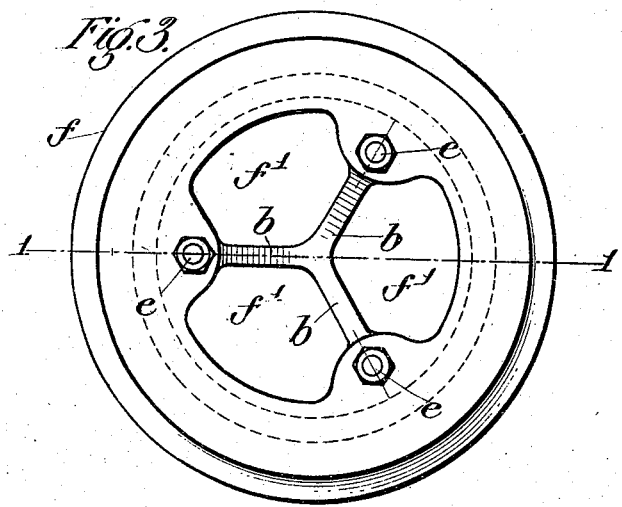
WITNESSES
INVENTOR

UNITED STATES PATENT OFFICE.

GUSTAV FUSCH, OF HANOVER, GERMANY, ASSIGNOR TO SCHUTTE AND KOERTING COMPANY, OF PHILADELPHIA, PENNSYLVANIA, A CORPORATION OF PENNSYLVANIA.

VALVE.

No. 881,234.　　　　　Specification of Letters Patent.　　　Patented March 10, 1908.

Application filed December 16, 1907. Serial No. 406,628.

*To all whom it may concern:*

Be it known that I, GUSTAV FUSCH, a subject of the Emperor of Germany, residing in Hanover, in the Province of Hanover and Kingdom of Prussia, German Empire, have invented a certain new and useful Improvement in Valves, and of which the following is a true and exact description, reference being had to the accompanying drawings, which form a part thereof.

The present invention relates to valves, and particularly to valve structures having circumferentially extending ports closed by elastic ring valves proper surrounding said ports and tending by their elasticity to close said ports.

The object of the invention is the construction of a valve having a cylindrical body made of metal rings assembled end to end and spaced apart to form ports between the rings. This makes it possible to form valve structures of different capacities by simply increasing or decreasing the number of rings employed, and, since the rings may be all alike, greatly cheapens the cost of production of valves.

By providing suitable spacing means for holding the rings apart the distances between the adjacent pairs of rings may be readily adjusted to vary the port area, and, with suitably shaped external ring surfaces, to vary the effective circumferential length of the valve seats and thus compensate for the decrease in elasticity of the ring valves which is apt to occur after the valves have been in service some time.

The various features of novelty which characterize the invention are pointed out with particularity in the claims annexed to and forming a part of this specification. For a better understanding of the invention, however, and the advantages possessed by it, reference may be had to the accompanying drawings and descriptive matter in which I have illustrated and described one of the forms in which my invention may be embodied.

Of the drawings, Figure 1 is a sectional elevation taken on the line 1—1 of Fig. 3. Fig. 2 is a sectional plan taken midway between the upper and lower ends of one of the rings forming the cylindrical body of the valve, and Fig. 3 is an inverted plan view of the valve.

The valve structure shown comprises a cylindrical body portion made up of a set of similar rings assembled end to end and spaced apart. The means for spacing the rings apart in the form shown comprises washers $c$ on rods $d$ parallel to the axis of the cylindrical body portion and passing through the registering holes $d'$ formed through the rings $a$.

The rings $a$ are assembled on a spider or frame having the disk-like upper end member $h$ from the lower side of which project the axially extending ribs $b$. The lower end member $f$ of the frame is secured to the upper end member by bolts $e$ passing through the member $f$ and threaded into the lower ends of the ribs $b$. Washers $i$ surrounding the bolts $e$ form removable spacers the thickness of which regulate the distance between the end members $f$ and $h$. In the form shown, a ring $f^2$ bearing against the member $f$ is interposed between it and the lower ring $a$. The lower ends of the rod $d$ extend into this ring $f^2$ and it is spaced away from the lower ring $a$ by washers $c$. The upper ring $a$ is spaced away from the top member $h$ by adjustable screws $h^2$.

Each ring $a$ has reversely inclined surfaces $a'$, and the adjacent outer surfaces $a'$ of each adjacent pair of rings $a$ unite to form a circumferentially extending trough shaped valve seat at the outer edge of the circumferentially extending port formed between the rings. A valve is provided for each of these ports in the form of an elastic ring $g$, preferably formed of rubber, which surrounds the ribs $b$ and is arranged to be normally seated by its elasticity on the valve seat formed by the adjacent surfaces $a'$. A similar valve $g$ is located between the upper surface $a'$ of the upper ring $a$ and the inclined surface $h'$ of the end member $h$.

It will be understood that when fluid entering the interior of the cylindrical body formed by the rings $a$ through port $f''$ in the lower end member $f$ is under a pressure greater than that surrounding the cylinder the elastic valves $g$ will stretch and permit the fluid to pass out through the ports between the rings $a$ and between the lower and upper end rings $a$ and the members $f^2$ and $h$ respectively, and that when the pressure within the rings is not greater than that without the rings the valves $g$ will contract and close the circumferentially extending ports.

By making the valve as shown any desired aggregate port area within limits may be obtained by merely varying the number of rings $a$ and valve rings $g$ used. The rings $a$ may be all alike as may the valves $g$, so that the only parts which need to be made in varying sizes to produce valves of different capacities are the rods $d$ and the end members $h$ of which different sizes are needed simply on account of the different lengths of ribs $b$ required. Furthermore, by replacing the washers $c$ and $i$ by washers of different thickness and by adjusting the screws $h^2$ different port areas may be obtained with the same set of rings $a$ and the same spider or frame parts. As the rings $a$ are moved closer together the effective circumferential lengths of the valve seats formed by the inclined surfaces $a'$ are lengthened. This, independent of the adjustment of port area, is of advantage as the decrease in elasticity of the valves $g$ which is apt to come after the valves have been in service a while can thus be taken care of so that the valves will tend to seat themselves with the desired pressure. With the construction shown a fault in one ring $a$ due either to a flaw in it or incident to its use can be taken care of by the simple expedient of inserting a new ring. The construction also permits an economical use of material, since the rapidly wearing parts of the valve, i. e., the rings $a$, can readily be made of bronze or the like and the rest of some cheaper material as cast iron.

Having now described my invention, what I claim as new and desire to secure by Letters Patent is:

1. A valve structure comprising a set of rings assembled end to end to form a cylindrical body and adapted to be held at varying distances apart whereby circumferentially extending ports are formed in the cylindrical body between the rings, said rings being shaped to form a trough shaped valve seat at the outer edge of each port and a set of elastic ring valves, one for each of said ports, surrounding said cylindrical body and each tending to close the corresponding port.

2. A valve structure, comprising a set of rings assembled end to end to form a cylindrical body, removable spacers inserted between the ends of adjacent rings to space them apart and thereby form circumferentially extending ports in said cylindrical body, each ring having reversely inclined surfaces $a'$, and a set of rubber ring valves surrounding said cylindrical body and arranged one between the adjacent surfaces $a'$ of each adjacent pair of rings and tending to close the corresponding port.

3. A valve structure comprising a spider formed of an end member $h$ having axially extending ribs $b$, an end member $f$ having an axially extending port $f''$ formed through it, removable spacers $i$ between the end members $h$ and $f$, means for securing the end members together with the spacers $i$ in place, a set of rings $a$ mounted end to end on, and surrounding the axial ribs $b$, removable spacers $c$ located between the adjacent ends of adjacent rings and spacing the rings apart to form a circumferentially extending port between each adjacent pair of rings, each ring having outer reversely inclined surfaces $a'$, and a set of rubber ring valves surrounding said ribs and arranged one between the adjacent surfaces $a'$ of each adjacent pair of rings $a$, and tending to close the port between said adjacent rings.

GUSTAV FUSCH.

Witnesses:
MARY SABARTH,
JOHANNES EBERDING,
ROBERT V. BÜLOW.